July 27, 1965  J. E. WALL  3,197,437
TRIOXANE POLYMERIZATION PROCESS
Filed Aug. 17, 1960
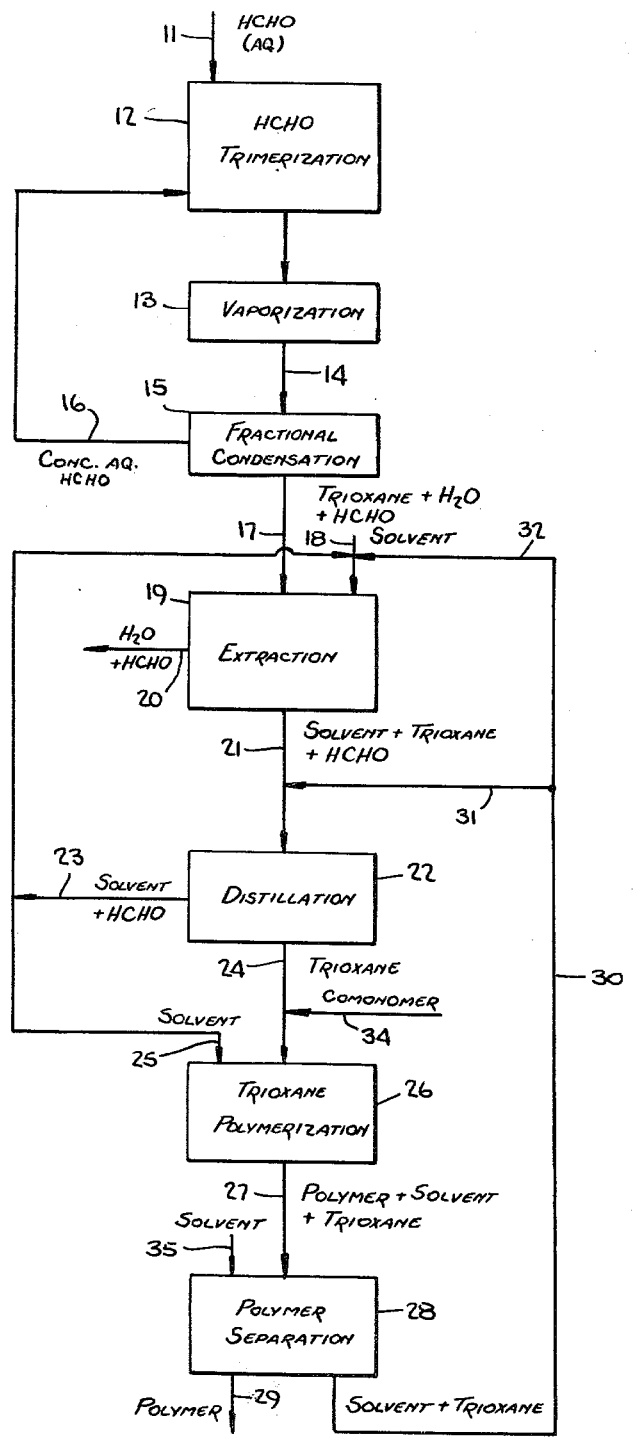

United States Patent Office 3,197,437
Patented July 27, 1965

3,197,437
TRIOXANE POLYMERIZATION PROCESS
James Estill Wall, Westfield, N.J., assignor to Celanese Corporation of America, New York, N.Y., a corporation of Delaware
Filed Aug. 17, 1960, Ser. No. 50,139
3 Claims. (Cl. 260—67)

This invention relates to a polymerization process and more particularly to a process for making oxymethylene polymers at a minimum cost and consumption of monomer.

It is known that high molecular weight oxymethylene polymers may be prepared by the polymerization of trioxane. In particular, it is known that the polymerization of trioxane may be advantageously carried out in the presence of an organic solvent for trioxane, such as cyclohexane.

Trioxane is usually prepared from aqueous formaldehyde solutions which are heated in the presence of a strong mineral acid, such as sulfuric acid. The reaction product, containing trioxane, water and unreacted formaldehyde, is recovered in a manner hereinafter described. In many instances, it is advantageous to make the trioxane and to polymerize it at the same location.

In the polymerization process, a portion of the trioxane remains unpolymerized and constitutes a portion of the total reaction product. The extent to which this unreacted trioxane may be recovered and the expense connected with such recovery will obviously affect the total cost of the process.

It is an object of the present invention to provide a trioxane polymerization method wherein the monomer is effectively and economically utilized. Other objects will appear hereinafter.

The objects of this invention are achieved by a method of producing an oxymethylene polymer which comprises extracting trioxane from an aqueous solution thereof with a stream of water-immiscible trioxane solvent to obtain an extracted trioxane stream, passing trioxane from said extracted stream into a polymerization zone to polymerize in the presence of said solvent and to produce a product comprising an oxymethylene polymer, unreacted trioxane and said solvent, separating oxymethylene polymer from said product to produce a residue comprising trioxane and said solvent and combining said residue with at least one of said aforementioned streams.

The invention may be more readily understood by reference to a specific embodiment described in connection with the accompanying figure.

Fresh aqueous formaldehyde (60% HCHO) is introduced through stream 11 into the formaldehyde trimerization zone 12 at a rate of 500 lbs./hr. Zone 12 is maintained at about 100° C. and a sulfuric acid catalyst is maintained therein at a concentration of about 3–7% of the weight of material in zone 12. The reactants are maintained in the trimerization zone for a period of about 4 hours and pass out overhead by vaporization, illustrated as zone 13. The sulfuric acid remains in the trimerization zone. The reaction product stream has about 19% of formaldehyde and about 5.5% of trioxane with the remainder being water except for small amounts of impurities such as formic acid.

The vaporized reaction products, as stream 14 are partially condensed in fractional condensation zone 15, which is conveniently a packed tower situated directly above the polymerization zone. The tower is approximately 30 feet tall and 3 feet in diameter and is filled with rings. It is operated at a top temperature of about 90° C. and a bottom temperature of about 100° C. Concentrated aqueous formaldehyde (20% HCHO) is condensed and passed out of the bottom of the tower at a rate of about 4,000 lbs./hr. as stream 16 and returned to the trimerization zone. The overhead vapors, designated as stream 17, contain about 50% of trioxane and 10% of formaldehyde and pass overhead from the tower at a rate of about 500 lbs./hr. as stream 17.

Stream 17 is introduced into extraction zone 19 while about 500 lbs./hr. of a water-immiscible organic solvent, such as benzene is introduced through stream 18. Extraction zone 19 is a tower having 10 plates. Stream 17 is introduced near the top at the tenth plate (counting from the bottom) while stream 18 is introduced near the bottom at the first plate.

A raffinate stream 20, containing about 20% of formaldehyde, 0.5% of trioxane and the remainder water is taken out of the bottom of the extraction zone at a rate of about 250 lbs. per hour. An extract stream 21, containing about 38% trioxane, 0.1% formaldehyde and the remainder organic solvent is taken out of the top of the extraction zone at a rate of about 800 lbs. per hour.

The extract stream is distilled in zone 22 which may be a fractionation tower having 50 plates. The tower operates at a top temperature of 80° C. and a bottom temperature of 118° C.

Overhead stream 23, having 0.1% of formaldehyde, 0.1% of trioxane and the remainder solvent is removed at a rate of about 530 lbs./hr. Vapor side stream 24, containing purified trioxane, is removed at a rate of about 300 lbs./hr. Some water-immiscible solvents, such as cyclohexane, form azeotropes in a system with trioxane and do not permit efficient separation by distillation. It is preferred to use a solvent, such as benzene, which has a low boiling point and which does not form an azeotrope in a system with trioxane. Benzene is particularly desirable as the water-immiscible solvent since it is an excellent extractant for trioxane from water, since it does not form an azeotrope with trioxane and it does form azeotropes with water and formic acid to facilitate their removal from the trioxane.

The purified trioxane stream 24 and a solvent stream 25 of about 30 lbs./hr. are introduced into polymerization zone 26. A polymerization catalyst, such as boron trifluoride dibutyl etherate is added at the rate of about .001 lb./hr. $BF_3$, conveniently being dissolved in solvent stream 25. The trioxane polymerization zone is maintained at 85° C. and atmospheric pressure and the residence time of the reactants therein is about 3 minutes.

The reaction product is discharged as stream 27 and contains about 70% of oxymethylene polymer, 20% of trioxane and the remainder substantially all solvent. A small amount of catalyst may remain in the product stream and this is neutralized by the addition thereto of about .01 lb./hr. of n-butylamine.

Polymer is separated from the product in separation zone 28 by evaporation. About 240 lbs./hr. of polymer product stream (containing about 0.1% of solvent and 0.1% of trioxane) is removed as stream 29 while the major amount of the solvent and trioxane (about 80 lbs./hr. containing about 62% of trioxane) is removed as stream 30. The polymer product stream 29 is further purified by washing in additional solvent and drying.

Stream 30 is advantageously condensed and returned, as stream 32 to extraction zone 19, preferably being combined with solvent stream 18. Since extraction zone 19 is capable of producing a trioxane-solvent mixture of substantially higher trioxane content than the combined fresh solvent and recycle feed, it can conveniently handle the stream 32 and restore its trioxane content to the system. Combined streams 18 and 32 with trioxane contents up to about 20% are lean enough to permit effective extraction in zone 19. Extraction zone 19 and subsequent distillation zone 22 may have to be designed at a larger capacity to handle the additional volume of feed but this is much more economical than providing a separate recovery system for the trioxane value of stream 30.

In other modifications of this invention, other conditions and alternative flow routs may be used. The formaldehyde trimerization and fractional condensation steps may be modified in formaldehyde to water ratio, temperature and time of reaction and temperature of fractionation to produce streams at 17 varying in trioxane content from about 20% to about 55% and in formaldehyde content from about 5% to about 40%.

The amount of solvent introduced through stream 18 to the extraction zone may vary suitably from about 1 to 4 times the weight of stream 17. If desired, all or a portion of distillation overhead stream 23 may be recycled to stream 18 and used as extraction solvent. A portion of distillation overhead stream 23 may also be used as solvent stream 25 to the polymerization zone.

If desired all or a portion of stream 30 may be directed through stream 31 and blended with extract stream 21.

Suitable polymerization catalysts for trioxane include boron trifluoride coordinate complexes with organic compounds in which oxygen or sulfur is the donor atom, as disclosed in U.S. Patent No. 2,989,506, issued to Hudgin and Berardinelli, boron trifluoride, as disclosed in U.S. Patent No. 2,989,507, issued to Hudgin and Berardinelli, boron triflouride complexes with water, as disclosed in application Serial No. 67,918, filed November 8, 1960, as a continuation-in-part of application Serial No. 718,124, filed by Hudgin and Berardinelli on February 28, 1958, and boron triflouride complexes with weakly basic nitrogen on phosphorus compounds as disclosed in U.S. Patent No. 2,989,511, issued to Schnizer. Suitable specific catalytic materials and proportions are disclosed in these applications which are incorporated herein by reference.

In a preferred embodiment of this invention the polymerization in zone 26 is a copolymerization of trioxane with minor amount of a comonomer. The comonomer may be introduced as stream 34. Suitable comonomers are the cyclic ethers with adjacent carbon atoms, as disclosed in U.S. Patent No. 3,027,352, issued to Walling, Brown and Bartz. The preferred comonomers are those having oxyethylene units such as ethylene oxide and 1,3-dioxolane. Specific comonomers and proportions are disclosed in the aforesaid U.S. Patent No. 3,027,352, which is incorporated herein by reference.

The comonomers are generally more reactive toward polymerization than trioxane and are used in relatively minor amounts. For these reasons, the comonomer is generally completely reacted and incorporated into the oxymethylene polymer. However, in those instances where a minor amount of comonomer remains in solution in the solvent, it may be recycled in stream 30 without any adverse effect.

In some cases it may be desirable to neutralized the catalyst in the polymerization reaction product in order to prevent degradation of the polymer. A small amount of a basic material, such as an n-butylamine may be added to the stream 27 for this purpose. Most of the neutralized catalyst remains with the polymer product and is separated therefrom by washing. A small portion of neutralized catalyst is recycled in stream 30 and collects in the bottom of distillation zone 22 until the periodic residue blowdown.

Instead of separating the polymer in zone 28 by evaporation, as described above, it may be separated by other methods, such as filtration. For some separation methods, it may be desirable to add additional solvent as stream 35, for ease of handling.

It is to be understood that the foregoing detailed description is given merely by way of illustration and that many variations may be made therein without departing from the spirit of my invention.

Having described my invention what I desire to secure by Letters Patent is:

1. Method of producing on oxymethylene polymer which comprises trimerizing aqueous formaldehyde in an acidic system to produce an aqueous product comprising trioxane and unreacted formaldehyde, extracting at least a portion of said aqueous product with a stream of benzene to obtain an extracted trioxane stream, passing trioxane and benzene from said extracted stream into a polymerization zone to produce a product comprising an oxymethylene polymer, unreacted trioxane and benzene, separating oxymethylene polymer from said product to produce a residue comprising trioxane and benzene and combining said residue with at least one of said aforementioned streams.

2. Method of producing an oxymethylene polymer which comprises trimerizing aqueous formaldehyde in the presence of sulfuric acid to produce an aqueous product comprising trioxane and unreacted formaldehyde, extracting at least a portion of said aqueous product with a stream of benzene to obtain an extracted trioxane stream, passing trioxane and benzene from said extracted stream and a cyclic ether comonomer having adjacent carbon atoms into a polymerization zone and copolymerizing said trioxane and said comonomer therein in the presence of a boron fluoride-containing trioxane polymerization catalyst to produce a product comprising an oxymethylene polymer, unreacted trioxane and benzene, separating oxymethylene polymer from said product to produce a residue comprising trioxane and benzene and combining said residue with said stream of benzene.

3. Method of producing an oxymethylene polymer which comprises trimerizing aqueous formaldehyde in an acidic system to produce an aqueous product comprising trioxane and unreacted formaldehyde, extracting at least a portion of said aqueous product with a stream of benzene to obtain an extracted trioxane stream, passing trioxane and benzene from said extracted stream into a polymerization zone to produce a product comprising an oxymethylene polymer, unreacted trioxane and benzene, separating oxymethylene polymer from said product to produce a residue comprising trioxane and benzene and combining said residue with said stream of benzene.

References Cited by the Examiner

UNITED STATES PATENTS

| | | | |
|---|---|---|---|
| 2,304,080 | 12/42 | Frank | 260—340 |
| 2,841,570 | 7/58 | MacDonald | 260—67 |
| 2,947,727 | 8/60 | Bartz | 260—67 |
| 2,951,059 | 8/60 | Axtell et al. | 260—67 |

WILLIAM H. SHORT, *Primary Examiner*

MILTON STERMAN, H. N. BURSTEIN, *Examiners*.